Figure 1:
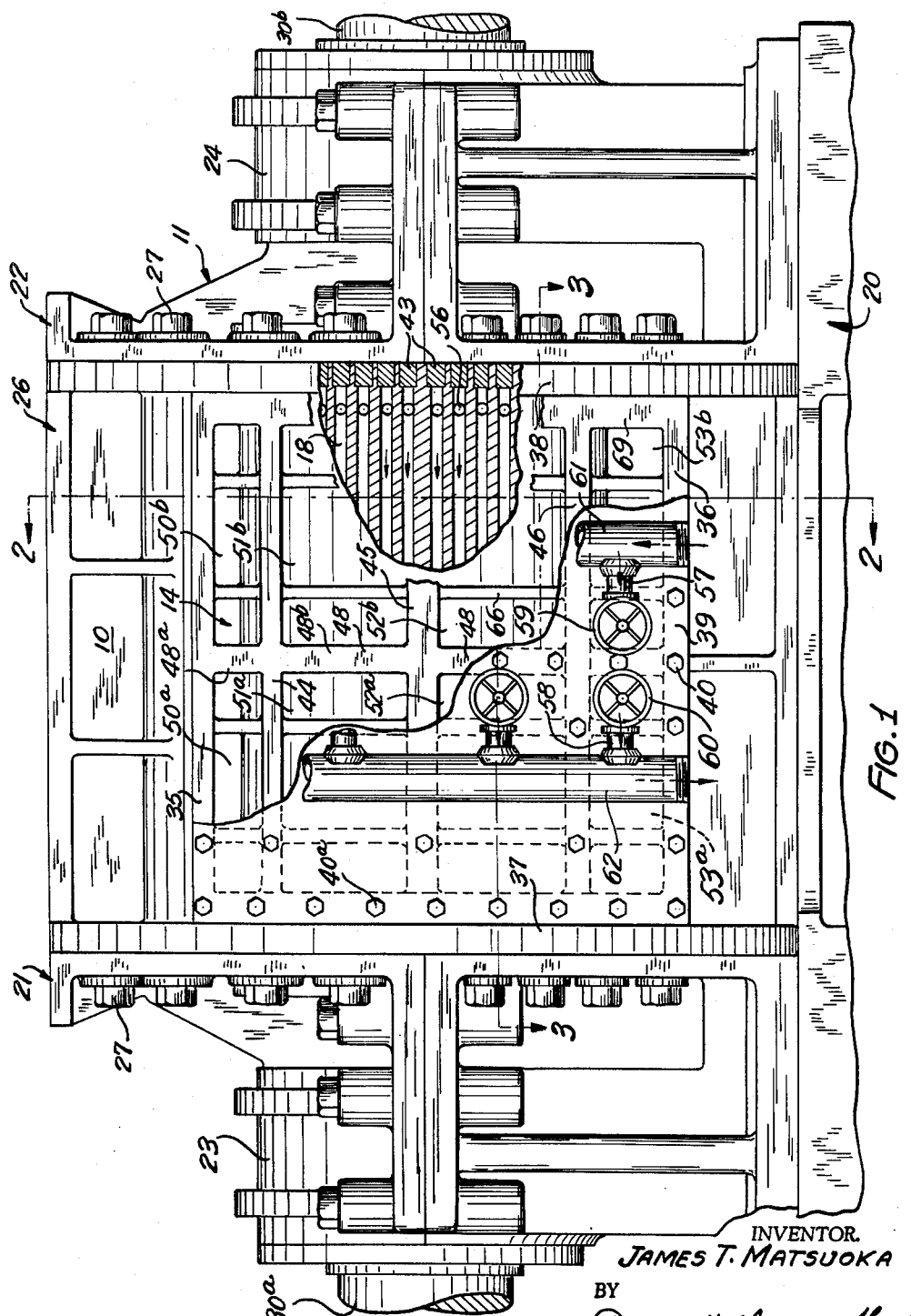

July 27, 1965

J. T. MATSUOKA 3,196,941

TEMPERATURE-CONTROLLED MIXING MACHINE

Filed Sept. 18, 1961

3 Sheets-Sheet 1

INVENTOR.
JAMES T. MATSUOKA
BY
Williams, David, Hoffmann & Joust
ATTORNEYS

INVENTOR.
JAMES T. MATSUOKA
BY
Williams, David, Hoffmann & Yount
ATTORNEYS

July 27, 1965 J. T. MATSUOKA 3,196,941
TEMPERATURE-CONTROLLED MIXING MACHINE
Filed Sept. 18, 1961 3 Sheets-Sheet 3

INVENTOR.
JAMES T. MATSUOKA
BY
Williams, David, Hoffmann & Yount
ATTORNEYS

United States Patent Office 3,196,941
Patented July 27, 1965

3,196,941
TEMPERATURE-CONTROLLED MIXING MACHINE
James T. Matsuoka, Brecksville, Ohio, assignor to Stewart Bolling & Company, Inc., Cleveland, Ohio, a corporation of Ohio
Filed Sept. 18, 1961, Ser. No. 138,830
5 Claims. (Cl. 165—109)

This invention relates to mixing machines of the kind having a mixing chamber and rotor means operable therein for performing mixing operations on various kinds of materials including plastic materials.

In the operation of such a mixing machine it is very important to the achievement of satisfactory results, both as to mixing duration and quality of the mixed material, to be able to control temperature conditions within the mixing chamber. In some cases the control of mixing chamber temperature involves the supplying of heat and in other cases the removal of heat, depending upon the character of the material being processed and other factors. It is therefore one of the objects of this invention to provide a novel mixing machine embodying means for effectively controlling temperature conditions within the mixing chamber thereof.

Another object is to provide a novel mixing machine in which curved side wall means of the mixing chamber has passages therein in a parallel relation to the rotation axis of a rotor means and adapted to be supplied with heat-exchange medium, the passages preferably being internally-smooth drilled passages so as to minimize resistance to flow therethrough when the heat-exchange medium is a fluid.

A further object is to provide a novel mixing machine having a mixing chamber and a temperature control chamber separated by an intervening wall containing a bank of passages, and means for causing heat-exchange medium to flow through the passages and control chamber in a given path relation for an effective temperature conditioning of the mixing chamber.

Additionally, this invention provides a mixing machine of the character above indicated and embodying other novel structural features including such a bank of passages connected with the control chamber for a flow of heat-exchange fluid therethrough in a series relation; the use of partition wall means in the control chamber for dividing the same into compartments with which groups of the passages are associated; the use of baffle wall means in the control chamber for confining the flow of heat-exchange fluid to a flow along the outer surface of the intervening wall; and the use of valve means in the heat-exchange fluid delivery means for regulating the volume of such heat-exchange fluid.

Figure 2:
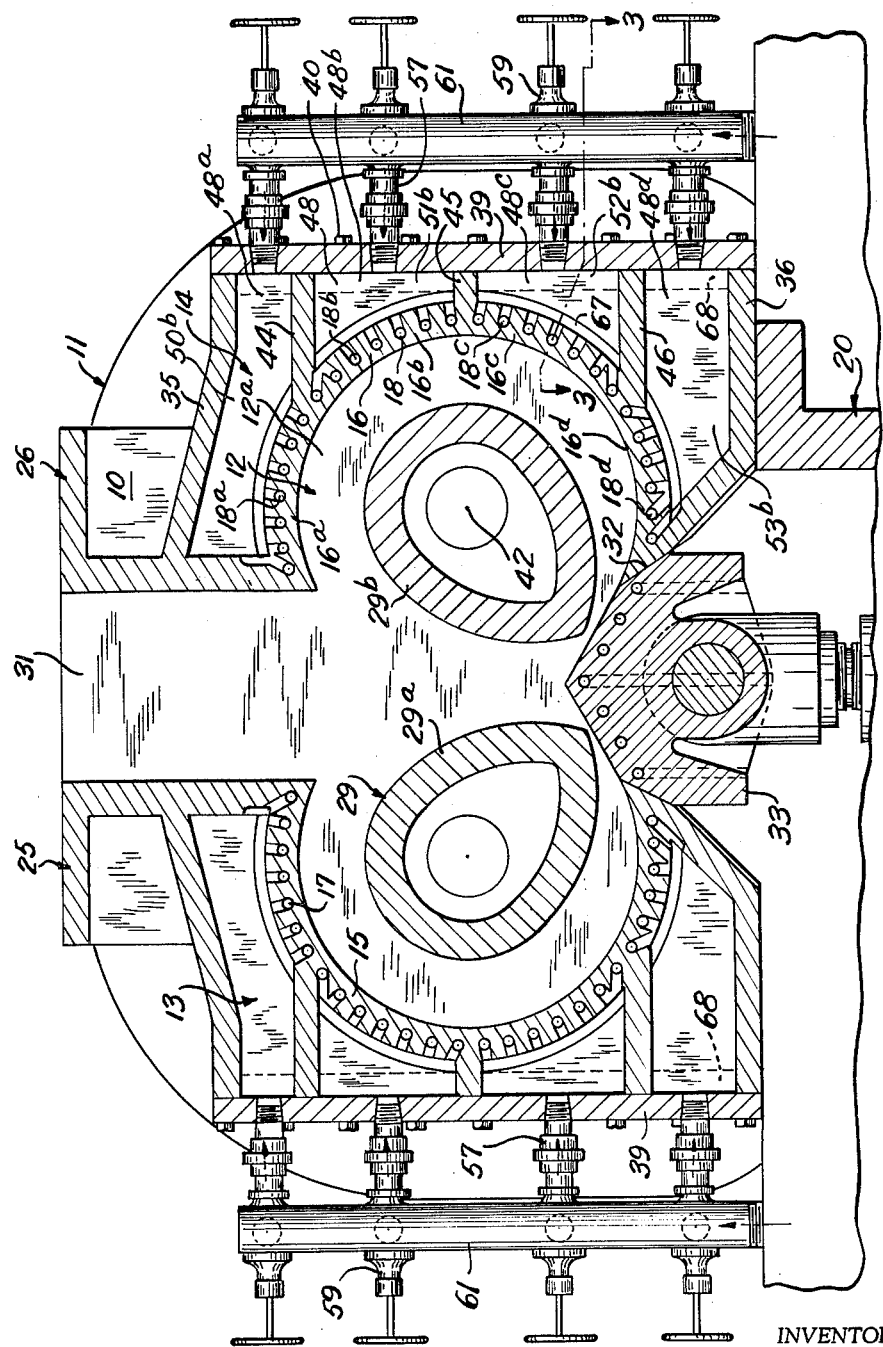
Figure 3:
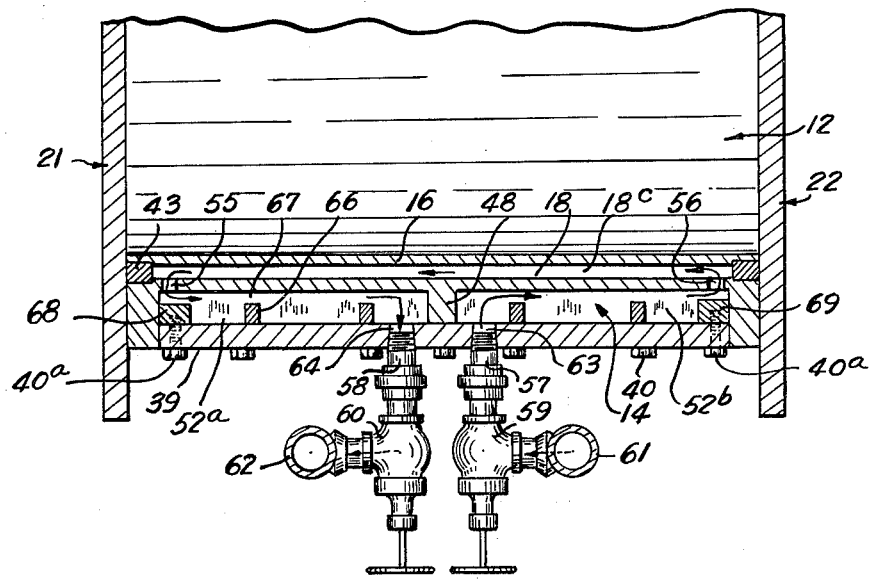

Other objects, advantages and new results of this invention will be apparent in the following detailed description and in the accompanying drawings forming a part of this specification and in which, FIG. 1 is a side elevation, with portions broken away, showing a mixing machine embodying means for controlling the temperature condition in the mixing chamber thereof;

FIG. 2 is a partial transverse vertical section taken through the machine on section line 2—2 of FIG. 1; and FIG. 3 is a partial horizontal section taken through one of the side units of the machine approximately as indicated by section line 3—3 of FIGS. 1 and 2.

One embodiment of the novel temperature-controlled mixing machine 10 is shown in the accompanying drawings as comprising a frame structure 11 containing a mixing chamber 12 and temperature control chambers 13 and 14 on opposite sides of the machine and separated from the mixing chamber by intervening side walls 15 and 16 having banks of heat-exchanger passages 17 and 18 therein.

The frame structure 11 includes a suitable base 20 having a pair of end units 21 and 22 supported thereon and provided with bearings 23 and 24. The frame structure 11 also comprises a pair of opposed side units 25 and 26 containing the control chambers 13, 14 and passages 17, 18 and which side units are disposed between the end units 21 and 22 and connected with the latter by suitable fastening members 27.

The mixing machine 10 includes suitable rotor means 29 operable in the mixing chamber 12 for performing the desired mixing of the plastic material or the like being processed in the machine and, as here shown, comprises a pair of rotors 29$^a$ and 29$^b$ connected with drive shafts 30$^a$ and 30$^b$ which are rotatable in the bearings 23 and 24. The mixing chamber 12 is provided at the top thereof with a charging passage 31 through which the material to be processed can be charged into the mixing chamber. At the bottom thereof the mixing chamber 12 is provided with a discharge passage 32 for discharging the mixed material and which discharge passage is normally closed by a suitable door 33 mounted for a downward opening swinging movement.

The side units 25 and 26 are of substantially the same construction in that each unit embodies the same temperature control means to be presently described in greater detail. Each side unit also contains a mixing chamber pocket 12$^a$ located on the concave side of the intervening wall of the unit and in which the associated rotor member is operable. The mixing chamber pockets 12$^a$ are here shown as being of somewhat greater area transversely thereof than one-half of the transverse area of a cylinder of corresponding radius and together provide the major portion of the volume of the mixing chamber 12. Since the side units 25 and 26 and the temperature control means thereof are of substantially the same construction, only one of these side units, namely the unit 26, need be described in detail.

The temperature control chamber 14 of the side unit 26 is formed on the convex outer side of the intervening curved wall 16 by suitable top, bottom and end walls 35, 36, 37 and 38 projecting laterally in an outward direction away from the convex portion of such curved wall as shown in FIG. 2. The top and bottom walls comprise the vertically spaced substantially horizontal walls 35 and 36, and the end walls comprise the axially spaced vertical walls 37 and 38. A suitable cover member 39 is secured to the side unit 26 by connecting screws 40 and closes the control chamber 14 at the outer side thereof.

The passages 18 of the intervening wall 16 comprise a bank of such passages to which heat-exchange medium is supplied as explained hereinafter for maintaining a controlled temperature condition in the mixing chamber 12. The passages 18 are formed directly in the intervening wall 16 so that the heat-exchange medium supplied to these passages will be located very close to the periphery of the mixing chamber 12 and will be highly effective in maintaining the desired temperature condition in the mixing chamber.

As hereinafter referred to, the heat-exchange medium supplied to the passages 18 is a fluid medium such as water, brine, steam or the like and, in accordance with the present invention, these passages are formed as drilled passages in the intervening wall 16 so as to be interiorly smooth for facilitating the flow of the heat-exchange fluid therethrough with minimum resistance. The passages 18 are here shown as disposed in a parallel relation to the rotation axis 42 of the associated rotor member 29$^b$ and are suitably spaced apart along the curvature arc of the wall 16. To facilitate the drilling of the passages 18 in the wall 16 they preferably extend from edge to edge of this wall as shown in FIG. 3 of the drawings. At the outer ends thereof the passages 18 have closure plugs 43 suitably secured therein.

In order to better control the distribution and flow of the heat-exchange medium being supplied to the machine 10, the control chamber 14 is divided into compartments with which certain groups of the passages 18 are associated. For this purpose the control chamber 14 is provided with a plurality of vertically spaced horizontal parallel partition walls, here shown as comprising upper, intermediate and lower partition walls 44, 45 and 46 (see FIG. 2), and also has a vertical partition wall 48 therein whose segments 48$^a$, 48$^b$, 48$^c$ and 48$^d$ co-operate with the horizontal partition walls 44, 45 and 46 to divide the interior of the control chamber 14 into pairs of laterally aligned compartments 50$^a$, 50$^b$; 51$^a$, 51$^b$; 52$^a$, 52$^b$; and 53$^a$, 53$^b$.

The laterally aligned pairs of these compartments lie adjacent axially extending corresponding segments 16$^a$, 16$^b$, 16$^c$ and 16$^d$ of the curved intervening wall 16, and these curved wall segments contain groups 18$^a$, 18$^b$, 18$^c$ and 18$^d$ of the passages 18. From the construction and arrangement of the control chamber 14, as above described, it will accordingly be seen that the group of passages 18$^a$ is associated with the pair of compartments 50$^a$ and 50$^b$; the group of passages 18$^b$ is associated with the pair of compartments 51$^a$ and 51$^b$; the group of passages 18$^c$ is associated with the pair of compartments 52$^a$ and 52$^b$; and the group of passages 18$^d$ is associated with the pair of compartments 53$^a$ and 53$^b$.

The connection of the passages 18 with the compartments of the control chamber 14 is such that the flow of fluid medium through the pairs of compartments and their associated groups of passages will be in a series relation so that all of the different segments 16$^a$, 16$^b$, 16$^c$ and 16$^d$ of the wall 16 will be effectively supplied with such heat-exchange medium for a satisfactory temperature conditioning of the portions of the mixing chamber 12 lying adjacent these segments.

To achieve the desired series flow of heat-exchange fluid through the pairs of compartments of the control chamber 14 and their associated passage groups, the passages of each group are connected adjacent opposite ends thereof with the associated pair of compartments by openings 55 and 56 providing relatively short connecting passages. As shown in FIG. 3, the openings 55 and 56 are located adjacent the outer ends of the associated pair of compartments and lie just inwardly of the closure plugs 43. The openings 55 and 56 are therefore relatively remotely spaced from the central vertical partition wall 48.

The heat-exchange fluid is supplied to and discharged from the groups of passages 18 by causing such fluid to flow through the associated pair of compartments and, for this purpose, a pair of supply and discharge pipe connections 57 and 58 is provided for each pair of compartments. The supply and discharge connections 57 and 58 are controlled by suitable valve devices, in this case, by manually operable valve devices 59 and 60. The supply and discharge pipe portions 57 and 58 connect the pairs of compartments with supply and discharge manifolds 61 and 62 through suitable cover openings 63 and 64 in which these pipe portions are threadedly engaged.

The location of the sectional view of FIG. 3 is such that this view shows the compartments 52$^a$ and 52$^b$ and their associated group of passages 18$^c$ whose outer end portions are connected with the respective compartments 52$^a$ and 52$^b$ by the connecting openings 55 and 56. The supply and discharge pipe portions 57 and 58 communicate with the compartments 52$^a$ and 52$^b$ at points adjacent to, and on opposite sides of, the central vertical partition wall 48.

It will accordingly be seen that heat-exchange fluid supplied to the compartment 52$^b$ by the supply pipe portion 57 must traverse substantially the full length of this compartment before it enters the group of passages 18$^c$ through the connecting openings 56. The fluid medium then flows through the passages 18$^c$ for the full length thereof before entering the compartment 52$^a$ adjacent the outer end of the latter through the connecting openings 55. The fluid medium thereupon traverses the length of the compartment 52$^a$ before being discharged therefrom through the delivery pipe portion 58.

The path of flow just described above for the compartments 52$^a$ and 52$^b$ and their associated group of passages 18$^c$ is also the path of flow followed by the heat-exchange medium in all of the other pairs of compartments and their associated groups of passages. From the flow path just described above it will be seen that the fluid medium passes through the pairs of compartments and their associated passage groups in a series relation with the fluid medium in direct heat-exchange contact with a maximum surface area of the side unit 26 whereby an effective temperature conditioning for the mixing chamber 12 will be achieved.

The flow of the heat-exchange medium through the pairs of compartments of the control chamber 14 is further controlled and directed so as to move along the external surface of the curved intervening wall 16 in contact therewith. This is achieved by providing baffle wall members 66 at suitable locations and in suitable number in the compartments. The baffle walls 66 extend from the cover member 39 toward the wall 16 but terminate short of the outer surface of the latter so as to define therewith a plurality of arcuate slots 67 at spaced points in the compartments. In the representative showing of FIG. 3 of the drawings there are two such slots 67 in each of the compartments 52$^a$ and 52$^b$ and cause the fluid flowing through these compartments to move along the external surface of the corresponding segments of the curved wall 16 in direct contact therewith for a maximum heat-transfer co-operation with the curved wall.

The cover member 39 is shown in the drawings as lying between the end walls 37 and 38 of the side unit 26 and seats against abutment strips 68 and 69 which are welded or otherwise suitably connected to such end walls. The cover connecting screws 40$^a$ and 40$^b$ located adjacent the ends of the cover extend into threaded openings of the abutment strips 68 and 69.

From the accompanying drawings and the foregoing detailed description it will now be readily understood that this invention provides a novel temperature-controlled mixing machine in which maximum effectiveness, for a given quantity temperature-control medium supplied, is achieved in temperature conditioning the mixing chamber of the machine. It will now also be recognized that, since this invention provides a control chamber which is divided into pairs of compartments and provides groups of passages in the wall of the mixing chamber in associated relation with the pairs of compartments, a desired series flow of fluid heat-exchange medium can be achieved for a more effective and more uniform temperature conditioning of the various different portions of the mixing chamber. Additionally, it will be understood that since the passages of the wall of the mixing chamber are drilled passages, they will be smooth internally thereof for minimizing resistance to flow of the heat-exchange fluid through such passages.

Although the temperature-controlled mixing machine of this invention has been illustrated and described herein to a somewhat detailed extent it will be understood, of course, that the invention is not to be regarded as being correspondingly limited in scope but includes all changes and modifications coming within the terms of the claims hereof.

Having described my invention, I claim:

1. In a mixing machine having a mixing chamber and a control chamber separated by an intervening wall common to both chambers, mixing means operable in said mixing chamber, other wall means closing said control chamber on the outer side thereof, said intervening wall having smooth parallel passages lying within the same, a partition wall extending transverse to said passages and disposed between said intervening wall and said other wall means and dividing said control chamber into compartments lying on opposite sides of said partition wall, said passages being connected adjacent their opposite ends with the respective compartments at points of the latter relatively remote from said partition wall, and means for connecting a heat-exchange fluid delivery and exhaust means with the respective compartments at points adjacent said partition wall whereby heat exchange fluid delivered to one compartment flows therethrough in contact with a portion of the outer surface of said common wall, through said passages and then through another compartment in contact with another portion of said common wall.

2. In a mixing machine having a mixing chamber and a control chamber separated by an intervening wall common to both chambers, mixing means operable in said mixing chamber, other wall means closing said control chamber on the outer side thereof, said intervening wall having smooth parallel passages lying within the same, a partition wall extending transverse to said passages and disposed between said intervening wall and said other wall means and dividing said control chamber into compartments lying on opposite sides of said partition wall, said passages being connected adjacent their opposite ends with the respective compartments at points of the latter relatively remote from said partition wall, means for connecting a heat-exchange fluid delivery and exhaust means with the respective compartments at points adjacent said partition wall whereby heat exchange fluid delivered to one compartment flows therethrough in contact with a portion of the outer surface of said common wall, through said passages and then through another compartment in contact with another portion of said common wall, and baffle wall means on said other wall means extending into said compartments from said other wall means and terminating short of the outer surface of said intervening wall for causing fluid in said control chamber to flow alongside of said intervening wall.

3. In a mixing machine having a mixing chamber and a control chamber separated by a curved intervening wall common to both chambers, mixing means operable in said mixing chamber, cover means closing said control chamber on the outer side thereof, said intervening wall having openings lying within the same and extending substantially from edge to edge thereof and providing a bank of parallel passages therein, partition means extending between said intervening wall and cover means and dividing said control chamber into pairs of compartments spaced lengthwise of said passages, said partition means including a center partition extending transverse to said passages and located substantially midway of the length of said control chamber, said bank of passages comprising passage groups associated with the respective compartment pairs and the passages of each group being connected adjacent their opposite ends with the respective compartments of the associated pair of compartments, and heat-exchange fluid delivery means having a pair of inlet and outlet portions for each pair of compartments, said inlet and outlet portions being connected with their associated compartments at points located adjacent to and on opposite sides of said center partition.

4. In a mixing machine having a mixing chamber and a control chamber separated by an intervening wall common to both chambers, mixing means operable in said mixing chamber, cover means closing said control chamber on the outer side thereof, said intervening wall having a bank of drilled parallel passages lying within the same and extending therethrough from edge to edge thereof, plugs in the ends of said passages, partition means extending between said intervening wall and cover means and dividing said control chamber into pairs of compartments, said partition means including a center partition extending transverse to said passages and located substantially midway of the length of said passages, said bank of passages comprising passage groups associated with the respective compartment pairs and the passages of each group being connected at points adjacent said plugs with the respective compartments of the associated pair of compartments, heat-exchange fluid delivery means having a pair of inlet and outlet portions for each pair of compartments, said inlet and outlet portions being connected with their associated compartments at points located adjacent to and on opposite sides of said center partition, and baffle wall means extending into said compartments from said cover means and terminating short of said intervening wall for confining fluid flow in said compartments to flow in contact with the outer surface of said intervening wall.

5. A mixing machine according to claim 4 and having valve means controlling fluid flow through said delivery means, said valve means comprising at least one variable-setting valve device for each compartment pair and located in one of the fluid connections thereto.

References Cited by the Examiner
UNITED STATES PATENTS

| | | | |
|---|---|---|---|
| 1,549,464 | 8/25 | Dinze | 165–168 |
| 1,571,599 | 2/26 | North | 165–168 |
| 1,654,544 | 1/28 | Hulse | 165–169 |
| 1,905,653 | 4/33 | Schranz | 165–168 |
| 2,450,575 | 10/48 | Bolling | 165–109 |
| 2,572,972 | 10/51 | Baldwin | 165–168 |

ROBERT A. O'LEARY, *Primary Examiner.*

CHARLES SUKALO, *Examiner.*